(12) United States Patent
Nordbruch et al.

(10) Patent No.: US 10,140,793 B2
(45) Date of Patent: Nov. 27, 2018

(54) METHOD FOR MONITORING A PARKING FACILITY

(71) Applicant: Robert Bosch GmbH, Stuttgart (DE)

(72) Inventors: Stefan Nordbruch, Kornwestheim (DE); Rolf Nicodemus, Bietigheim-Bissingen (DE); Stefan Hoffmann, Bietigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/529,405

(22) PCT Filed: Oct. 22, 2015

(86) PCT No.: PCT/EP2015/074451
§ 371 (c)(1),
(2) Date: May 24, 2017

(87) PCT Pub. No.: WO2016/083027
PCT Pub. Date: Jun. 2, 2016

(65) Prior Publication Data
US 2017/0330399 A1 Nov. 16, 2017

(30) Foreign Application Priority Data
Nov. 26, 2014 (DE) ........................ 10 2014 224 106

(51) Int. Cl.
B60R 25/10 (2013.01)
G07C 9/00 (2006.01)
(Continued)

(52) U.S. Cl.
CPC .......... *G07C 9/00119* (2013.01); *B60R 25/31* (2013.01); *G06Q 10/10* (2013.01);
(Continued)

(58) Field of Classification Search
CPC ..... G07C 9/00119; B60R 25/31; G06Q 10/02
(Continued)

(56) References Cited

U.S. PATENT DOCUMENTS 7,688,225 B1  3/2010  Haynes et al.
2010/0156672 A1  6/2010  Yoo et al.
(Continued)

FOREIGN PATENT DOCUMENTS

DE  102011080557 A1  2/2013
DE  102012222561 A1  6/2014
(Continued)

OTHER PUBLICATIONS

International Search Report for PCT/EP2015/074451, dated Dec. 22, 2015.

*Primary Examiner* — Dhaval Patel
(74) *Attorney, Agent, or Firm* — Norton Rose Fulbright US LLP; Gerard Messina

(57) ABSTRACT

A method for monitoring a parking facility that has an area reserved for autonomously driving vehicles, including: receiving an access request associated with a person for the reserved area, checking whether the person is authorized for access to the reserved area, granting access if the person is authorized for access, monitoring a behavior of the person in the reserved area. Also described is a corresponding device, system and computer program.

12 Claims, 1 Drawing Sheet

(51) Int. Cl.
    *G06Q 10/10*  (2012.01)
    *G08G 1/005* (2006.01)
    *G08G 1/00*  (2006.01)
    *B60R 25/31* (2013.01)
    *G06Q 10/02* (2012.01)

(52) U.S. Cl.
    CPC ............. *G08G 1/005* (2013.01); *G08G 1/205* (2013.01); *G06Q 10/02* (2013.01)

(58) Field of Classification Search
    USPC ........ 340/426.1, 5.6, 5.7, 932.2; 701/23, 24, 701/26, 117, 408; 705/5
    See application file for complete search history.

(56) References Cited

U.S. PATENT DOCUMENTS

| | | | |
|---|---|---|---|
| 2012/0188100 A1* | 7/2012 | Min | .................. G08G 1/143 340/932.2 |
| 2013/0188031 A1* | 7/2013 | Park | .................. H04N 7/002 348/77 |
| 2013/0231824 A1* | 9/2013 | Wilson | .................. G05D 1/0246 701/26 |
| 2014/0111304 A1 | 4/2014 | Hashim-Waris | |
| 2014/0149156 A1 | 5/2014 | Schroeder | |
| 2015/0138001 A1* | 5/2015 | Davies | .................. G08G 1/149 340/932.2 |
| 2015/0241241 A1* | 8/2015 | Cudak | .................. B62D 15/027 701/408 |

FOREIGN PATENT DOCUMENTS

| | | |
|---|---|---|
| DE | 102012222562 A1 | 6/2014 |
| EP | 2474943 A1 | 7/2012 |
| JP | 2004118342 A | 4/2004 |
| JP | 2004206584 A | 7/2004 |
| JP | 2007195130 A | 8/2007 |
| WO | 2004006208 A1 | 1/2004 |

* cited by examiner

METHOD FOR MONITORING A PARKING FACILITY

FIELD OF THE INVENTION

The present invention relates to a method and a device for monitoring a parking facility that has an area reserved for autonomously driving vehicles. Furthermore, the present invention relates to a parking system for vehicles and to a computer program.

BACKGROUND INFORMATION

In fully automated (autonomous) so-called valet parking, a vehicle is parked by its driver at a drop-off point, for example in front of a parking garage, and from there the vehicle drives itself into a parking position/parking space and back again to the drop-off point.

Published patent application DE 10 2012 222 561 A1 refers to a system for managed parking areas for transferring a vehicle from a start position to a destination position.

A situation may occur, in which, following the handover at the drop-off point, a driver or a passenger of the vehicle must access the vehicle once more, for example because something was forgotten in the vehicle.

Furthermore, a situation may occur, in which the vehicle is not locked, a vehicle key being inside the vehicle. In such a situation, it must be ensured that persons only go to their own vehicles or to the vehicles to which they were ordered to go (in the case of parking facility staff acting on the order of the driver). It must be ensured that no violation occurs on the vehicles (for example a theft of objects from a vehicle) or with the vehicles (for example driving the vehicle).

SUMMARY OF THE INVENTION

The objective of the present invention may therefore be seen as providing a method for monitoring a parking facility that has an area reserved for autonomously driving vehicles, which makes it possible to ensure that no violation occurs on or with parked vehicles by persons (for example a driver, a passenger or a parking facility staff member).

The objective of the present invention may also be seen as providing a corresponding device, a corresponding parking system and a corresponding computer program.

These objectives are attained by the respective subject matter of the descriptions herein. Advantageous developments of the present invention are the subject matter of the further descriptions herein.

According to one aspect, a method is provided for monitoring a parking facility that has an area reserved for autonomously driving vehicles, comprising the following steps:

receiving an access request associated with a person for the reserved area,
checking whether the person is authorized for access to the reserved area,
granting access if the person is authorized for access, and
monitoring a behavior of the person in the reserved area.

According to yet another aspect, a device is provided for monitoring a parking facility having a reserved area for autonomously driving vehicles, the device being configured to carry out the method according to the present invention.

According to another aspect, a parking system for vehicles is provided, comprising a parking facility, which has an area reserved for autonomously driving vehicles, and the device according to the present invention.

According to another aspect, a computer readable medium having a computer program is provided, comprising program code for implementing the method according to the present invention when the computer program is executed on a computer.

The present invention thus comprises in particular the idea of monitoring persons present in the reserved area. This yields in particular the technical advantage of making it possible to determine whether a person is attempting to access vehicles without authorization and/or whether a person is present in the reserved area without authorization. Thus it is possible to avoid a violation on or with vehicles in an efficient manner.

The fact that, prior to granting access to a person, a check is first performed to determine whether this person is at all authorized to enter the reserved area yields in particular the technical advantage of establishing an effective control over who gains access to the reserved area and who wants to gain access to the reserved area.

According to one specific embodiment, a vehicle is associated with the person, which is parked within the reserved area. By way of the access request, the person desires access to the reserved area in order to get to the vehicle, for example, in order to pick something up from inside the vehicle.

According to one specific embodiment, the person is a driver, a passenger or parking facility staff member, who was instructed by the driver or passenger to go to the vehicle, for example to pick up something from inside the vehicle.

In one specific embodiment, the vehicle is parked in a parking position within the reserved area.

A parking facility in the sense of the present invention may also be called a parking area and used as an area for parking vehicles. The parking facility thus forms in particular a contiguous area, which has multiple parking spaces (in the case of a parking lot on private property) or parking stalls (in the case of a parking lot on public property). According to one specific embodiment, the parking facility may be comprised by a car park. In particular, the parking facility is comprised by a parking garage.

Autonomous in the sense of the present invention means in particular that the vehicle navigates or drives or is guided in the parking facility independently, that is, without an intervention of a driver. The vehicle thus drives independently in the parking facility without a driver having to control the vehicle for this purpose. A guidance comprises in particular a lateral and/or a longitudinal guidance of the vehicle. Such an autonomously driving vehicle that is able to park and unpark automatically is referred to as an AVP vehicle. AVP stands for "automatic valet parking" and may be translated as "automatic parking process". Vehicles that do not have this AVP functionality are referred to as normal vehicle for example.

A drop-off position in the sense of the present invention is a position at which a driver of the vehicle is able to park his vehicle for an autonomous parking process and from which he is at a later point in time able to pick up his vehicle again. The drop-off position may be outside of the reserved area.

A parking position in the sense of the present invention is a position at which the vehicle is to park autonomously.

One specific embodiment provides for the vehicle autonomously to navigate or to drive or to be guided by remote control from the drop-off position to the parking position.

Another specific embodiment provides for the vehicle to park autonomously or to park in a remote-controlled manner in the parking position.

Another specific embodiment provides for the vehicle to unpark autonomously or to unpark in a remote-controlled manner from the parking positon.

Another specific embodiment provides for the vehicle autonomously to navigate or drive or be guided in a remote-controlled manner from the parking position to the drop-off position.

One specific embodiment provides for the monitoring to include a check to determine whether the person moves toward a vehicle associated with the person that is parked in the reserved area and/or whether the person moves in the reserved area along a route specified for the person and/or whether the person moves toward a vehicle not associated with the person that is parked in the reserved area and/or whether the person stops by this vehicle and/or accesses this vehicle.

This yields in particular the technical advantage of making it possible to check whether the person behaves in a manner that deviates from an permitted or authorized behavior. Thus it is permitted that the person moves toward the vehicle associated with the person and/or moves along the specified route in the reserved area. As long as the person exhibits this behavior, there is normally no need to intervene, for example by triggering an alarm. If the person, however, should deviate from the aforementioned behavior, then this is a criterion for unauthorized or impermissible behavior of the person. That is to say that in this case a violation risk is increased. In particular, the present invention then provides for suitable measures to be taken such as triggering an alarm for example.

It is normally inadmissible behavior of the person when the person moves toward a vehicle not associated with the person that is parked in the reserved area and/or stops by this vehicle and/or accesses this vehicle, for example wanting to open it or opening it. For a vehicle that is not associated with the person is not cleared for the person to be allowed to gain access to the vehicle. There exists therefore no reason for the person to move toward this vehicle. Such a behavior is thus in particular a criterion or an indication that the person wants to access the vehicle improperly. Thus it is advantageously possible to take appropriate measures in order to prevent this access or the violation.

Another specific embodiment provides for the behavior of the person to be documented and/or for an alarm signal to be output, based on the monitoring. This yields in particular the technical advantage of making it possible to retrace the behavior of the person within the reserved area even at a later time. This is possible in particular on account of the documentation, which comprises in particular a recording of the behavior of the person within the area. The alarm signal may be a silent alarm signal. The alarm signal may be in particular a non-silent, that is, a loud alarm signal. According to one specific embodiment, the output of an alarm signal comprises alarming a security service and/or the police, for example. According to one specific embodiment, the output of an alarm signal comprises alarming parking facility staff so that the staff thereby may be dispatched or is dispatched to the person.

Another specific embodiment provides for the additional monitoring of an entrance and/or an exit of the reserved area in order to be able to determine unauthorized entries into and/or exits from the reserved area. This yields in particular the technical advantage of making it possible to monitor whether and which persons enter or exit the reserved area. This advantageously makes it possible to determine if persons unannounced are attempting to gain access to the reserved area.

One specific embodiment provides for the entrance and/or exit to be monitored by a monitoring arrangement such as for example light barriers and/or door-opening sensors and/or cameras and/or radar sensors and/or lidar sensors and/or ultrasonic sensors and/or laser sensors. The aforementioned monitoring arrangement detect in particular if a person is attempting to gain access to the reserved area, that is, wants to enter the area. In particular, the aforementioned monitoring arrangement detect if a person is attempting to exit the reserved area via the exit.

Another specific embodiment provides for the check, whether the person is authorized to access the reserved area, to include a reception of a specified signal of a transmitter carried by the person. This yields in particular the technical advantage of allowing for an improved monitoring of the person. This is due to the fact that the specified signals are received. These signals are emitted by a transmitter that the person carries along. The person thus signals his presence by way of the transmitter and may also include his position and/or in particular his identification.

According to one specific embodiment, multiple such transmitters are provided, which are configured to be in particular identical or which may be different.

According to one specific embodiment, a transmitter includes an RFID chip. Such an RFID chip in particular makes it possible to detect the person as authorized and/or to track the person better.

One specific embodiment provides for the transmitter to be comprised by a terminal device, which may be a mobile terminal device. The mobile terminal device is for example a mobile telephone, in particular a smartphone. That means in particular that a mobile terminal device that the person carries along emits signals that can be used to monitor the person, in particular for authorizing the person.

Another specific embodiment provides for a parking position of a vehicle associated with the person, which is parked in the reserved area, to be transmitted to the person. This yields in particular the technical advantage that the person is informed about where the vehicle is parked that the person wishes to access or that the person wishes to reach. For normally the person does not have this information since the vehicle drove autonomously to the parking position or was guided to the parking position by remote control, without the person being in the vehicle. That is to say that the person does not know where the vehicle was parked in the reserved area. Because of the fact, however, that the parking position is now transmitted to the person, the person knows where the vehicle is located within the reserved area. Thus the person is able to find the vehicle within the reserved area quickly and efficiently.

Another specific embodiment provides for a map, in particular a digital map, which may be an interactive digital map, of the reserved area to be transmitted to the person in addition to the parking position. This yields in particular the technical advantage of allowing for an improved navigation to the parking position. This additionally yields the technical advantage that the person is able to find the parking position efficiently.

According to one specific embodiment, the map is a physical map, which may be a paper map.

According to one specific embodiment, the map is a digital map.

According to one specific embodiment, the map is an interactive digital map. That means in particular that the person is able to interact with the digital map.

According to one specific embodiment, the digital map is transmitted to the person via a communication network, for example to a terminal device, which may be a mobile terminal device, for example to a mobile telephone.

One specific embodiment provides for the communication network to comprise a mobile telephony network and/or a WLAN network.

In one specific embodiment, a communication via the communication network is encrypted.

Another specific embodiment provides for a setpoint trajectory to be followed by the person in order to reach the parking position to be transmitted to the person in addition to the parking position. This yields in particular the technical advantage that the person does not personally have to plan or ascertain a route or path or trajectory to the parking position. For the trajectory to be walked or followed, here the setpoint trajectory, is specified for the person in that it is transmitted to the person. In particular, the setpoint trajectory is transmitted to a terminal device, which may be to a mobile terminal device, via a communication network. The terminal device, in particular the mobile terminal device, includes for example a navigation system, which is able to guide the person to the parking position by using the transmitted setpoint trajectory.

Another specific embodiment provides that for reaching the parking position a navigation infrastructure of the parking facility configured for emitting navigation signals is operated so that these navigation signals are emitted in such a way that the parking position may be reached by following the navigation signals. This yields in particular the technical advantage of improving the guidance of the person to the parking position. The person thus advantageously only has to follow the navigation signals in order to reach the parking position. This is analogous to a lighthouse or a beacon. A navigation infrastructure includes, according to one specific embodiment, light transmitters for emitting light signals.

Yet another specific embodiment provides for at least a subarea of the reserved area that is different from a subarea in which a vehicle associated with the person is parked to be sealed off against access by the person. This yields in particular the technical advantage of making it possible to prevent the person from gaining access to the subarea in which the vehicle is not parked. Thus it is advantageously possible to avoid a violation on or with vehicles that are located in this subarea, in which the vehicle associated with the person is not parked.

The process of sealing off includes for example a closing of one or more doors or gates.

Another specific embodiment provides for a traffic of autonomously driving vehicles within the reserved area to be coordinated as a function of persons located in the reserved area in order to prevent a collision of autonomously driving vehicles and the vehicles located in the reserved area and/or the persons located in the reserved area. This yields in particular the technical advantage of being able to avoid a collision of autonomously driving vehicles and the vehicles located in the reserved area. In particular, this advantageously reduces or even eliminates a collision risk between the persons located in the reserved area and the autonomously driving vehicles. In particular, this makes it possible to optimize a traffic flow of autonomously driving vehicles within the reserved area in that these autonomously driving vehicles no longer have to consider persons located in the reserved area.

Device features result analogously from corresponding method features and vice versa.

The present invention will be explained in greater detail in the following with reference to the exemplary embodiments.

BRIEF DESCRIPTIONS OF THE DRAWINGS

DETAILED DESCRIPTION

Figure 1:
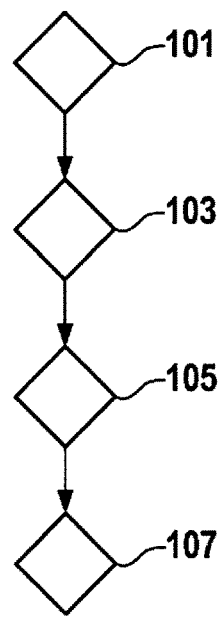
FIG. 1 shows a flow chart of a method for monitoring a parking facility.

FIG. 1 shows a flow chart of a method for monitoring a parking facility that has an area reserved for autonomously driving vehicles.

In a step 101, an access request for the reserved area is received, the access request being associated with a person. For example, the person transmits the access requests. This occurs for example via a communication network.

In a step 103, a check is performed to determine whether the person is authorized for access to the reserved area. In a step 105, access is granted if the person is authorized for the access. If the person is not authorized for the access, no access is granted.

In a step 107, a behavior of the person in the reserved area is monitored.

According to one specific embodiment, in step 107, a check is performed in particular to determine whether the person moves toward the vehicle associated with the person that is parked in the reserved area and/or whether the person moves along a route specified for the person, for example a specified setpoint trajectory, and/or whether the person moves toward a vehicle not associated with the person that is parked in the reserved area and/or whether the person stops by this vehicle and/or accesses this vehicle.

The monitoring is performed in particular by a monitoring system. According to one specific embodiment, the monitoring system includes one or multiple video cameras and/or one or multiple radar sensors and/or one or multiple ultrasonic sensors and/or one or multiple lidar sensors and/or one or multiple laser sensors and/or one or multiple light barriers and/or one or multiple door opening sensors.

Figure 2:
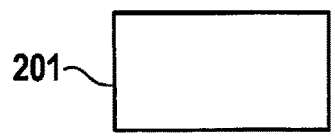
FIG. 2 shows a device for monitoring a parking facility.

FIG. 2 shows a device 201 for monitoring parking facility having an area reserved for autonomously driving vehicles. The device 201 is configured to carry out the method according to the present invention.

According to one specific embodiment, device 201 includes the monitoring system.

According to one specific embodiment, device 201 includes a communication interface for receiving an access request via a communication network.

According to one specific embodiment, device 201 includes a processor configured to check whether the person is authorized for access to the reserved area and to grant access if the person is authorized for it. The processor is configured in particular to control the monitoring system so that the monitoring system monitors the behavior of the person in the reserved area.

Figure 3:
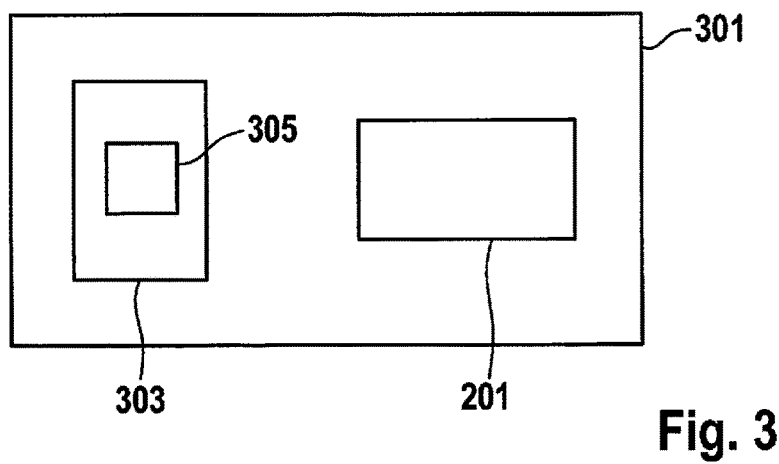
FIG. 3 shows a parking system for vehicles.

FIG. 3 shows a parking system 301 for vehicles.

Parking system 301 includes a parking facility 303, which has an area 305 reserved for autonomously driving vehicles. Parking system 301 furthermore includes the device 201 from FIG. 2.

The present invention thus comprises in particular the idea of providing a technical and efficient concept which is able to ensure that no violation occurs on or with autonomously driving vehicles, in particular AVP vehicles, by persons (for example a driver, a passenger or a staff member). A basic condition for this purpose is in particular that an exclusive area is provided for autonomously driving vehicles, in particular for AVP vehicles. This exclusive area is the reserved area.

Here, the idea of the present invention is in particular that the persons located within the reserved area are monitored by a monitoring system, which may also be called a parking area management monitoring system.

One specific embodiment provides for a driver and/or a passenger to register, that is, to send an access request, in order to obtain access to the vehicle parked in the reserved area.

One specific embodiment provides for an instructed staff member, who was instructed by the driver or the passenger, to register for this task of obtaining access to the vehicle, that is, to send an access request.

According to one specific embodiment, this access request is transmitted to device 201.

According to one specific embodiment, device 201 is part of a parking facility management server for managing a parking facility. A parking facility management server may be called in particular a parking area management server.

According to one specific embodiment, the registration, that is, the transmission or sending of the access request, may be performed through a staff member and/or at a parking facility automated teller machine. That is to say that the person is able to go to a parking facility automated teller machine and submit an access request.

According to one specific embodiment, the requesting person identifies himself as driver or as passenger. The identification may occur via a reservation receipt or handover receipt. In particular, the identification may occur via an electronically readable identification document.

If the requesting person is authorized to gain access to the reserved area, then this access is granted to this person. In particular, the access is granted by the parking area management, that is, in particular by the device.

According to one specific embodiment, the device, that is, in particular the parking area management, communicates to the person the location, that is, the parking position, of the vehicle. According to one specific embodiment, this is provided exclusively, that is to say that only the parking position is communicated.

One specific embodiment provides that, in addition to the parking position, a map of the reserved area, in particular of the entire parking facility including the reserved are, is made available to the person.

According to one specific embodiment, the map is a physical map, which may be a paper map.

According to one specific embodiment, the map is a digital map, which is transmitted in particular to a terminal device, which may be a mobile terminal device, for example a mobile telephone, for example via WLAN or a mobile telephony network, that is, generally via a communication network.

According to one specific embodiment, the digital map is an interactive map so that a person is able to interact with the digital map by operating the (mobile) terminal device, after the interactive digital map has been loaded onto the (mobile) terminal device.

According to one specific embodiment, the map is a digital map, in particular an interactive digital map, that has a navigation function. That is to say that, in addition to the digital map, a setpoint trajectory to be followed by the person in order to reach the parking position is also transmitted. This makes it possible to navigate within the reserved area on the basis of the digital map.

According to one specific embodiment, multiple maps, that is, for example, a physical map, which may be a paper map, and a digital map are delivered to the person.

One specific embodiment provides for a navigation infrastructure that is configured to emit navigation signals. After access is granted, this navigation infrastructure is operated in such a way that it is possible to reach the parking position by following the navigation signals. The navigation infrastructure comprises for example one or multiple light signal transmitters or light transmitters that emit light signals. The person thus merely has to follow these light signals in order to reach the parking position of his vehicle.

One specific embodiment then provides for the person to walk to the vehicle, that is, move toward the vehicle. This occurs in particular with the aid of the transmitted parking position and/or the transmitted map.

One specific embodiment provides for the person to be monitored and documented, for example by way of the device, that is, for example using the parking area management system, while the person moves in the parking facility, particularly within the reserved area.

The monitoring and the documenting is performed in particular by one or multiple video cameras, generally by a monitoring system or a monitoring device.

One specific embodiment provides for the person to be monitored and documented on the way to the vehicle.

One specific embodiment provides for the person to be monitored and documented at the vehicle.

One specific embodiment provides for the person to be monitored and documented on the way back, that is, on the way away from the vehicle.

If the person does not walk to the vehicle and/or uses another route than the specified route and/or stops at another vehicle, opens it or otherwise accesses the vehicle, then one specific embodiment provides for the following actions to be taken individually or in combination: Documenting and recording the actions of the person, for example using the monitoring system, dispatching staff to the person and/or alarming a security service or the police.

In another specific embodiment, the person is provided with a digital transmitter, for example comprising an RFID chip. The person must then carry this digital transmitter along. By way of such a digital transmitter, it is advantageously possible to identify the person as authorized and/or to track the person more effectively.

One specific embodiment provides for a mobile terminal device to be used for this purpose. That is to say in particular that the mobile terminal device, for example a smartphone or a mobile telephone, functions as a transmitter so that the person may be identified as authorized and tracked more effectively.

So that persons cannot enter unannounced into the reserved area, which may also be called an AVP area, one specific embodiment provides for this area, that is, in particular an entrance and/or an exit of the reserved area, to be monitored, for example by a monitoring system, in particular using light barriers, door opening sensors and/or cameras.

If it is determined, for example by the parking area monitoring system, that is, by the system according to the present invention, that an unauthorized access by a person to the reserved area has occurred or is occurring, then one specific embodiment provides for at least one of the following actions to be taken individually or in combination. Documenting the actions of the person, in particular by the system of the present invention, dispatching of staff to the person and/or alarming a security service or the police.

One specific embodiment provides for subareas of the reserved area or only one subarea of the reserved area, in which the vehicle to which access is to be obtained by the access request is not parked or located, to be made inaccessible to the requesting person, that is, is in particular closed off, in particular by locking one or more doors. This may be initiated or carried out in particular by the parking area management system, that is by the system of the present invention.

According to one specific embodiment, the parking facility management system, that is, the system of the present invention, additionally makes use of the overview over the persons and their movements within the reserved area in coordinating and planning the autonomously driving vehicles, in particular the AVP vehicles. This occurs for example when assigning parking positions to currently driving AVP vehicles so that the AVP vehicles on their travel routes do not collide with these persons.

What is claimed is:

1. A method for monitoring a parking facility, which has an area exclusively reserved for autonomously driving vehicles, the method comprising:
   receiving, via a communication interface, an access request to access a vehicle, associated with a person, for the reserved area;
   checking, via the processor, whether the person is authorized for accessing the reserved area;
   granting, via the processor, the access if the person is authorized for access, wherein the access is not granted if the person is not authorized; and
   monitoring, via the processor, a behavior of the person in the reserved area;
   wherein the monitoring includes a check to determine whether the person moves toward the vehicle associated with the person that is parked in the reserved area and/or whether the person moves in the reserved area along a path specified for the person and/or whether the person moves toward a vehicle not associated with the person that is parked in the reserved area and/or stops at this vehicle and/or accesses this vehicle,
   wherein an entrance and/or an exit of the reserved area is monitored to determine unauthorized entries and/or exits, and
   wherein a parking position of a vehicle associated with the person that is parked in the reserved area is communicated to the person.

2. The method of claim 1, wherein, based on the monitoring, the behavior of the person is documented and/or an alarm signal is output.

3. The method of claim 1, wherein the check to determine whether the person is authorized to access the reserved area includes a reception of a specified signal of a transmitter carried by the person.

4. The method of claim 3, wherein the transmitter includes a terminal device, in particular a mobile terminal device.

5. The method of claim 1, wherein, in addition to the parking position, a map, a digital map, or an interactive digital map, of the reserved area is transmitted to the person.

6. The method of claim 1, wherein, in addition to the parking position, a setpoint trajectory to be followed by the person to reach the parking position is transmitted to the person.

7. The method of claim 1, wherein for reaching the parking position a navigation infrastructure of the parking facility configured for emitting navigation signals is operated so that it emits navigation signals so as to make it possible to reach the parking position by following the navigation signals.

8. The method of claim 1, wherein at least a subarea of the reserved area is closed off against access by the person, which subarea is different from a subarea in which a vehicle associated with the person is parked.

9. The method of claim 1, wherein a coordination of a traffic of autonomously driving vehicles within the reserved area is performed as a function of persons located in the reserved area to avoid a collision of autonomously driving vehicles and the vehicles located in the reserved area and/or the persons located in the reserved area.

10. A device for monitoring a parking facility having an exclusively reserved area for autonomously driving vehicles, comprising:
   a control unit having a processor and configured to perform the following:
      receiving, via a communication interface, an access request to access a vehicle, associated with a person, for the reserved area;
      checking, via the processor, whether the person is authorized for accessing the reserved area;
      granting, via the processor, the access if the person is authorized for access, wherein the access is not granted if the person is not authorized; and
      monitoring, via the processor, a behavior of the person in the reserved area;
   wherein the monitoring includes a check to determine whether the person moves toward the vehicle associated with the person that is parked in the reserved area and/or whether the person moves in the reserved area along a path specified for the person and/or whether the person moves toward a vehicle not associated with the person that is parked in the reserved area and/or stops at this vehicle and/or accesses this vehicle,
   wherein an entrance and/or an exit of the reserved area is monitored to determine unauthorized entries and/or exits, and
   wherein a parking position of a vehicle associated with the person that is parked in the reserved area is communicated to the person.

11. A parking system for vehicles, comprising:
   a parking facility, which has an area reserved for autonomously driving vehicles; and
   a device, having a processor, for monitoring the parking facility having an exclusively reserved area for the autonomously driving vehicles, configured to perform the following:
      receiving, via a communication interface, an access request to access a vehicle, associated with a person, for the reserved area;
      checking, via the processor, whether the person is authorized for accessing the reserved area;
      granting, via the processor, the access if the person is authorized for access, wherein the access is not granted if the person is not authorized; and
      monitoring, via the processor, a behavior of the person in the reserved;
   wherein the monitoring includes a check to determine whether the person moves toward the vehicle associated with the person that is parked in the reserved area and/or whether the person moves in the reserved area along a path specified for the person and/or whether the person moves toward a vehicle not associated with the person that is parked in the reserved area and/or stops at this vehicle and/or accesses this vehicle, wherein an entrance and/or an exit of the reserved area is monitored to determine unauthorized entries and/or exits, and wherein a parking position of a vehicle associated with the person that is parked in the reserved area is communicated to the person.

12. A non-transitory computer readable medium having a computer program, which is executable by a processor, comprising:

a program code arrangement having program code for monitoring a parking facility, which has an area exclusively reserved for autonomously driving vehicles, by performing the following:

receiving, via a communication interface, an access request to access a vehicle, associated with a person, for the reserved area;

checking, via the processor, whether the person is authorized for accessing the reserved area;

granting, via the processor, the access if the person is authorized for access, wherein the access is not granted if the person is not authorized; and monitoring, via the processor, a behavior of the person in the reserved;

wherein the monitoring includes a check to determine whether the person moves toward the vehicle associated with the person that is parked in the reserved area and/or whether the person moves in the reserved area along a path specified for the person and/or whether the person moves toward a vehicle not associated with the person that is parked in the reserved area and/or stops at this vehicle and/or accesses this vehicle, wherein an entrance and/or an exit of the reserved area is monitored to determine unauthorized entries and/or exits, and wherein a parking position of a vehicle associated with the person that is parked in the reserved area is communicated to the person.

* * * * *